(12) United States Patent
Saeed

(10) Patent No.: US 12,731,951 B2
(45) Date of Patent: Sep. 8, 2026

(54) INSTALLATION ACCESSORIES FOR LINEMAN HOT STICKS

(71) Applicant: Hubbell Incorporated, Shelton, CT (US)

(72) Inventor: Dana Khalid Saeed, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 445 days.

(21) Appl. No.: 18/301,308

(22) Filed: Apr. 17, 2023

(65) Prior Publication Data

US 2023/0253747 A1 Aug. 10, 2023

Related U.S. Application Data

(63) Continuation of application No. PCT/US2021/055731, filed on Oct. 20, 2021, and a (Continued)

(51) Int. Cl.
*H01R 43/00* (2006.01)
*B25B 13/50* (2006.01)

(Continued)

(52) U.S. Cl.
CPC ............. *H01R 43/00* (2013.01); *B25B 13/50* (2013.01); *B25B 23/08* (2013.01); *H02G 1/02* (2013.01); *B25B 23/10* (2013.01); *B25B 23/12* (2013.01)

(58) Field of Classification Search
CPC ......... H01R 11/11; H01R 11/12; H01R 11/14; H01R 11/15; H01R 11/26; H01R 31/00; H01R 31/02; H01R 31/006; H01R 43/00; H02G 1/02; H02G 7/00; H02G 7/053; H02G 7/20; B25B 13/50; B25B 23/08; B25B 23/10; B25B 23/12; B25B 27/023; B23P 19/00
See application file for complete search history.

(56) References Cited

U.S. PATENT DOCUMENTS

| | | | |
|---|---|---|---|
| 1,920,168 | A | 8/1933 | Bodendieck |
| 1,987,584 | A | 1/1935 | Bodendieck |

(Continued)

FOREIGN PATENT DOCUMENTS

| | | |
|---|---|---|
| CN | 203445264 | 2/2014 |
| CN | 208622967 | 3/2019 |

(Continued)

*Primary Examiner* — Robert J Scruggs
(74) *Attorney, Agent, or Firm* — Ruggiero McAllister & McMahon LLC; Edward L McMahon

(57) ABSTRACT

A hot stick installation accessory is provided. The accessory includes a cap portion and a moving section. The cap portion has a region that removably holds an electrical coupling component. The moving section slides with respect to the cap portion between an open and a closed position and pivots with respect to the cap portion between a first position and a second position. The moving section includes a threaded member that is engageable by a hook of a hot stick so that rotation of the hot stick, and thus of the hook, results in rotation of the threaded member into threaded engagement with the moving section to move the moving section between the open and closed positions.

16 Claims, 6 Drawing Sheets

Related U.S. Application Data continuation of application No. 17/011,073, filed on Sep. 3, 2020, now Pat. No. 12,347,992.

(60) Provisional application No. 63/094,679, filed on Oct. 21, 2020, provisional application No. 62/896,890, filed on Sep. 6, 2019.

(51) Int. Cl.

| | |
|---|---|
| ***B25B 23/08*** | (2006.01) |
| ***H02G 1/02*** | (2006.01) |
| *B25B 23/10* | (2006.01) |
| *B25B 23/12* | (2006.01) |

(56) References Cited

U.S. PATENT DOCUMENTS

| | | | | | |
|---|---|---|---|---|---|
| 2,002,981 | A | | 5/1935 | Halladay | |
| 2,605,661 | A | | 8/1952 | Heuer | |
| 2,931,004 | A | * | 3/1960 | Wood | H01R 11/15 439/806 |
| 2,966,817 | A | * | 1/1961 | Wengen | H01R 11/14 81/53.1 |
| 2,983,053 | A | | 5/1961 | Bartholomew | |
| 2,986,053 | A | | 5/1961 | Atman | |
| 3,600,784 | A | | 8/1971 | Propst | |
| 3,629,805 | A | * | 12/1971 | Peek | H01R 11/15 439/864 |
| 4,846,725 | A | | 7/1989 | Williams | |
| 10,361,493 | B2 | | 7/2019 | De France | |
| 2005/0247166 | A1 | | 11/2005 | Sasaki | |
| 2008/0194153 | A1 | * | 8/2008 | De France | H01R 4/4872 439/822 |

FOREIGN PATENT DOCUMENTS

| | | |
|---|---|---|
| CN | 111525449 | 6/2020 |
| KR | 20180038818 | 4/2018 |

* cited by examiner

INSTALLATION ACCESSORIES FOR LINEMAN HOT STICKS

CROSS REFERENCE TO RELATED APPLICATIONS

This application is a continuation of International Application PCT/US21/55731 filed Oct. 20, 2021, which claims the benefit of U.S. Application 63/094,679 filed on Oct. 21, 2020, this application is a continuation of U.S. application Ser. No. 17/011,073 filed on Sep. 3, 2020, which claims the benefit of U.S. Application 62/896,890 filed on Sep. 6, 2019, the entire contents of all of which are incorporated by reference in their entirety.

BACKGROUND

1. Field of the Invention

The present disclosure is related to lineman hot sticks. More particularly, the present disclosure is related to accessories for lineman hot sticks that allow for installation of electrical coupling components onto overhead power distribution lines.

2. Description of Related Art

Spring-loaded hot sticks for manipulating various electrical coupling components are known and are described in the prior art such as, but not limited to, U.S. Pat. Nos. 1,920,168 and 3,600,784, which are incorporated by reference herein. Hot sticks allow linemen to engage overhead power distribution lines, which can increase the safety of the linemen.

One electrical coupling component that linemen often connect to overhead power distribution lines are known as spring-loaded parallel pad clamp connectors. These clamp connectors are described in the prior art such as, but not limited to, Applicant's own U.S. Pat. No. 7,666,024, which is also incorporated by reference herein.

It has been proposed to modify the clamp connector so that they can be installed using a hot stick as described in Applicant's own U.S. Pat. No. 10,361,493.

However, it has been determined by the present application that there is a need for additional accessories that allow for the installation of electrical coupling components using lineman hot sticks.

SUMMARY

A hot stick installation accessory is provided. The accessory includes a cap portion and a moving section. The cap portion has a region that removably holds an electrical coupling component. The moving section slides with respect to the cap portion between an open and a closed position and pivots with respect to the cap portion between a first position and a second position. The moving section includes a threaded member that is engageable by a hook of a hot stick so that rotation of the hot stick, and thus of the hook, results in rotation of the threaded member into threaded engagement with the moving section to move the moving section between the open and closed positions.

In some embodiments either alone or together with any one or more of the aforementioned and/or after-mentioned embodiments, the region of the cap portion is two regions.

In some embodiments either alone or together with any one or more of the aforementioned and/or after-mentioned embodiments, the region of the cap portion is configured so that the accessory is installable and removable from above the electrical coupling component.

In some embodiments either alone or together with any one or more of the aforementioned and/or after-mentioned embodiments, the moving section includes a cam slot and is secured to the cap portion by a pin through the cam slot.

In some embodiments either alone or together with any one or more of the aforementioned and/or after-mentioned embodiments, the moving section has a base with a threaded opening positioned to threadably receive the threaded member.

In some embodiments either alone or together with any one or more of the aforementioned and/or after-mentioned embodiments, the moving section further includes an arm depending from the moving section towards the region.

In some embodiments either alone or together with any one or more of the aforementioned and/or after-mentioned embodiments, the accessory further includes a tool portion engageable with a bolted connection of the electrical coupling component. The tool portion is engageable by the hook of the hot stick so that rotation of the hot stick, and thus of the hook, results in rotation of the tool portion and the bolted connection.

In some embodiments either alone or together with any one or more of the aforementioned and/or after-mentioned embodiments, the tool portion further includes a securing device configured to releasably connect to the bolted connection.

In some embodiments either alone or together with any one or more of the aforementioned and/or after-mentioned embodiments, the securing device is selected from a group consisting of a set screw, a ball and detent mechanism, a magnet, an adhesive, an interference fit, a tolerance fit, and any combinations thereof.

A method of installing an electrical coupling component using lineman hot sticks is also provided. The method includes the steps of: connecting a bolted connection of the electrical coupling component to a tool portion and connecting the tool portion to a first lineman hot stick; using the first lineman hot stick to secure the electrical coupling component to a load or tap conductor; connecting a second lineman hot stick to an accessory having a cap portion; and using the second lineman hot stick to move the cap portion of the accessory over a top of the electrical coupling component so that an upper jaw of the electrical coupling component is received by a holding region of the cap portion.

In some embodiments either alone or together with any one or more of the aforementioned and/or after-mentioned embodiments, the method further includes using the second lineman hot stick to move a moving section of the accessory, which is pivotally and slideably connected to the cap portion, to a closed position onto the load or tap conductor.

In some embodiments either alone or together with any one or more of the aforementioned and/or after-mentioned embodiments, the method further includes using the second lineman hot stick to move the upper jaw of the electrical coupling component to an open position and securing the electrical coupling component to a load or tap conductor.

In some embodiments either alone or together with any one or more of the aforementioned and/or after-mentioned embodiments, the method further includes using the first lineman hot stick to cause the tool portion to tighten the bolted connection of the electrical coupling component.

In some embodiments either alone or together with any one or more of the aforementioned and/or after-mentioned embodiments, the method further includes removing the first lineman hot stick and the tool portion from the bolted connection of the electrical coupling component.

In some embodiments either alone or together with any one or more of the aforementioned and/or after-mentioned embodiments, the method further includes using the second lineman hot stick to move the moving section of the accessory to an open position.

In some embodiments either alone or together with any one or more of the aforementioned and/or after-mentioned embodiments, the method further includes using the second lineman hot stick to remove the cap portion of the accessory over the top of the electrical coupling component so that the upper jaw of the electrical coupling component is no longer received by the holding region of the cap portion.

In some embodiments either alone or together with any one or more of the aforementioned and/or after-mentioned embodiments, the step of connecting the bolted connection of the electrical coupling component to the tool portion includes using a securing device configured to releasably connect to the bolted connection.

In some embodiments either alone or together with any one or more of the aforementioned and/or after-mentioned embodiments, the bolted connection has a shear region and the securing device is secured to the shear region The above-described and other features and advantages of the present disclosure will be appreciated and understood by those skilled in the art from the following detailed description, drawings, and appended claims.

The above-described and other features and advantages of the present disclosure will be appreciated and understood by those skilled in the art from the following detailed description, drawings, and appended claims.

DETAILED DESCRIPTION

Figure 1:
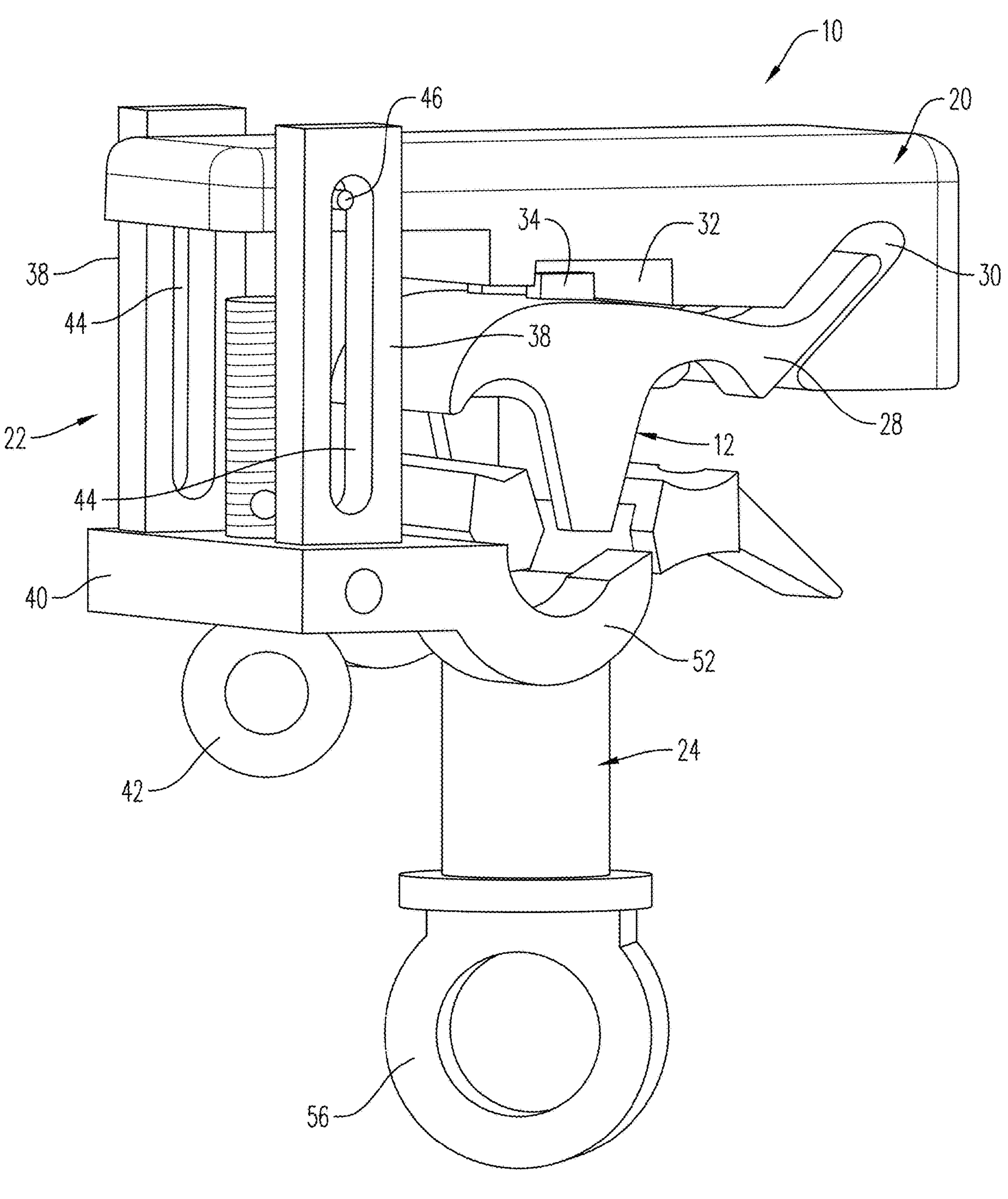
FIG. 1 is a perspective view of an exemplary embodiment of a hot stick installation accessory according to the present disclosure having an electrical coupling component installed therein.

Referring to the drawings and in particular to FIGS. 1-8, an exemplary embodiment of an installation accessory according to the present disclosure is shown and is generally referred to by reference numeral 10. Accessory 10 is configured to allow a user to install an electrical coupling component 12 on an energized overhead line or main conductor 14 and a load or tap conductor 18 using a hot stick 36.

Advantageously, accessory 10 is configured secure conductor 18 to the accessory during installation to prevent inadvertent disengagement of component 12. Further, accessory 10 is configured to be installed and/or removed from above the electrical coupling component 12 in an easy and repeatable manner.

Thus, accessory 10 provides a simple, easy to use device for the installation of electrical coupling component 12 to conductors 14, 18 using hot stick 36.

Accessory 10 is disclosed herein in use with electrical coupling component 12 that is shown as a spring-loaded parallel pad clamp connector such as that disclosed by Applicant's own U.S. Pat. No. 7,666,024. Component 12 has a bolted connection 16 that can make installation on overhead conductors difficult using hot stick 36. Of course, it is contemplated by the present disclosure for accessory 10 to find use with any other component 12 that has bolted connection 16 such as, but not limited to, line dampers, clamping insulators, wedge connectors, and others.

Accessory 10 is described in more detail with simultaneous reference to FIGS. 1-8. Accessory 10 includes a cap portion 20, a moving section 22, and, in some embodiments a tool portion 24. Tool portion 24 is illustrated as a socket for operatively engaging bolted connection 16 as will be described in more detail below.

Cap portion 20 has one or more holding regions 26 (two shown) that are sized and shaped to removably receive and hold component 12 therein. Region(s) 26 is/are configured to allow accessory 10 to be installed and removed from component 12 from the top or upper side of the component (i.e., from above the component). In the illustrated embodiments, holding regions 26 are shown including an area 30 that holds an upper jaw 28 of component 12 and another area 32 that holds a bolt head 34 of the component.

Of course, it is contemplated by the present disclosure for cap portion 20 to have more or less than two regions 26. For example, it is contemplated by the present disclosure for cap portion 20 to have any desired number of regions 26 sufficient to conform to an upper region of component 12 so that the cap portion can be installed and removed from the top or upper side of the component.

Moving section 22 is configured to removably secure accessory 10 to component 12 and, in some embodiments, to conductor 18.

Section 22 includes one or more legs 38 (two shown), a base 40, and a threaded member 42 that is threadably engaged with the base. Legs 38 include cam slots 44 defined therein that receive pins 46 to moveably secure section 22 and cap portion 20 to one another. In some embodiments, legs 38 are secured to base 40 along an axis that runs parallel to threaded member 42.

Pins 46 pass through cam slots 44 of legs 38 and into openings 48 of base 40. As such, section 22 is configured so that base 40 slides along legs 38 relative to cap portion 20 between an open position shown in FIGS. 1 and 2 and a closed position shown in FIG. 3. Furthermore, section 22 is configured—when in the open position—to pivot or rotate about pins 46 between a first position shown in FIGS. 1-3 and a second position shown in FIG. 4.

Figure 2:
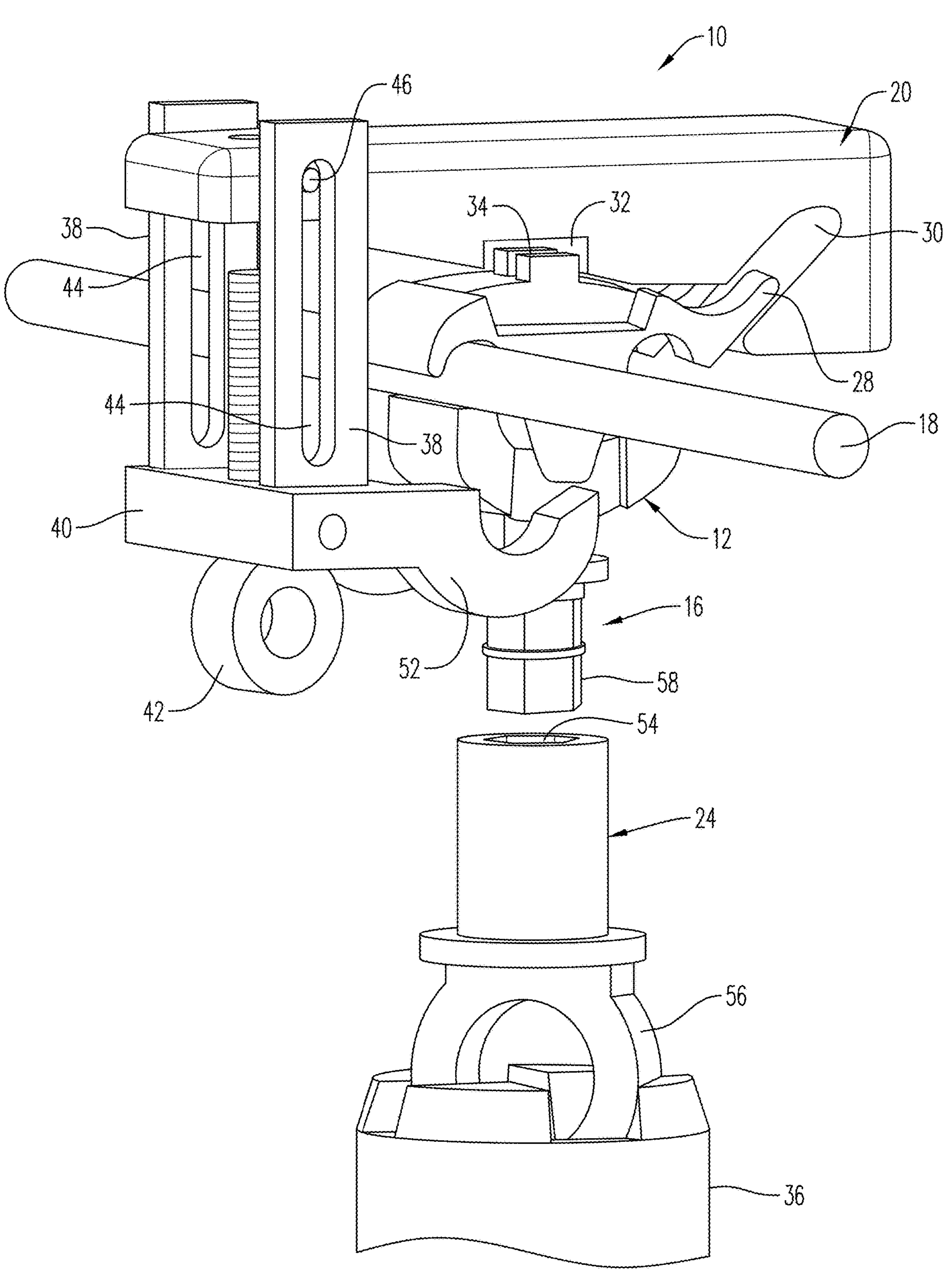
FIG. 2 is a perspective view of the hot stick installation accessory of FIG. 1 during installation of the electrical coupling component to a load or tap conductor.
Figure 3:
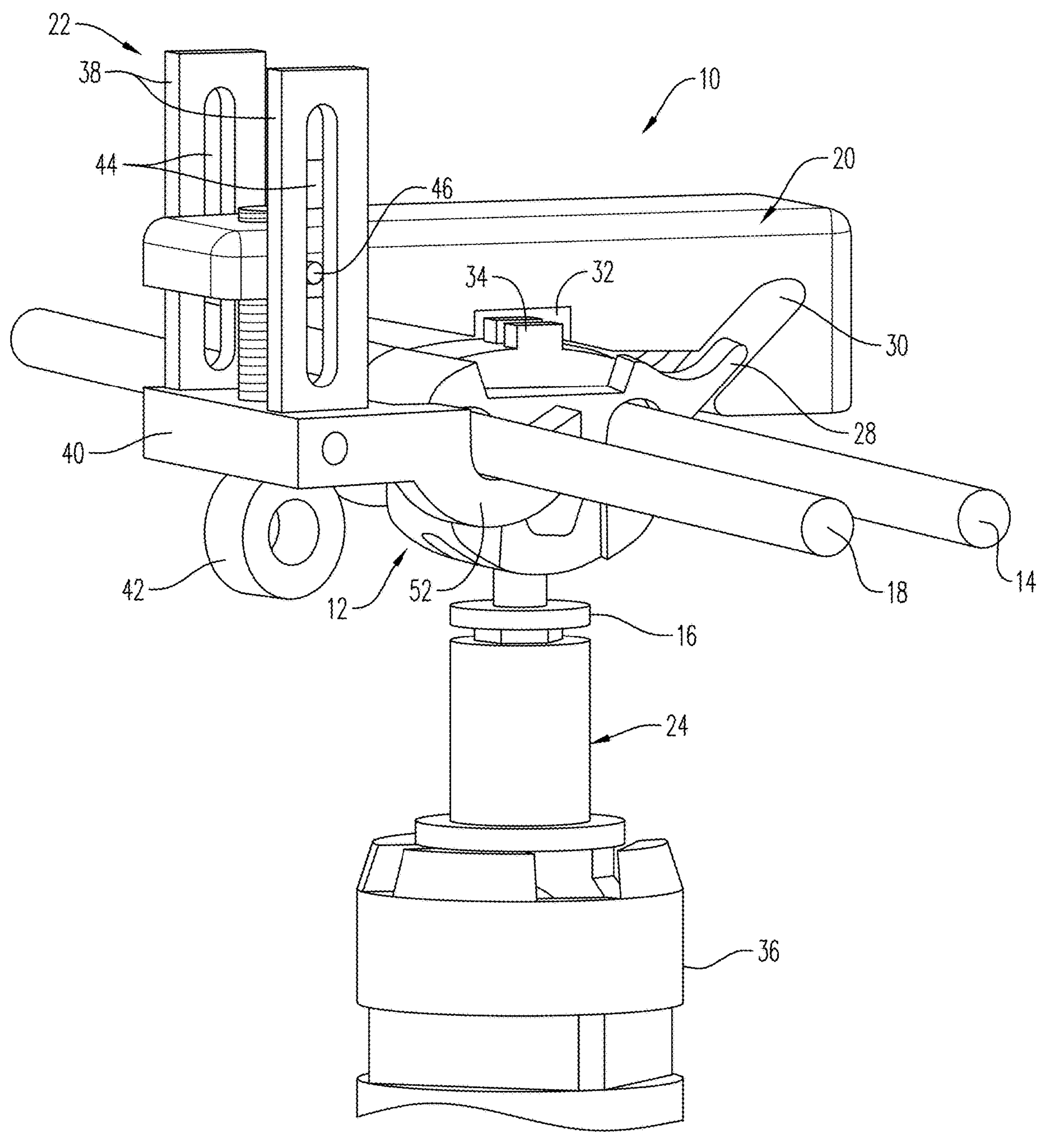
FIG. 3 is a perspective view of the hot stick installation accessory of FIG. 2 after installation of the electrical coupling component to a line or main conductor.
Figure 4:
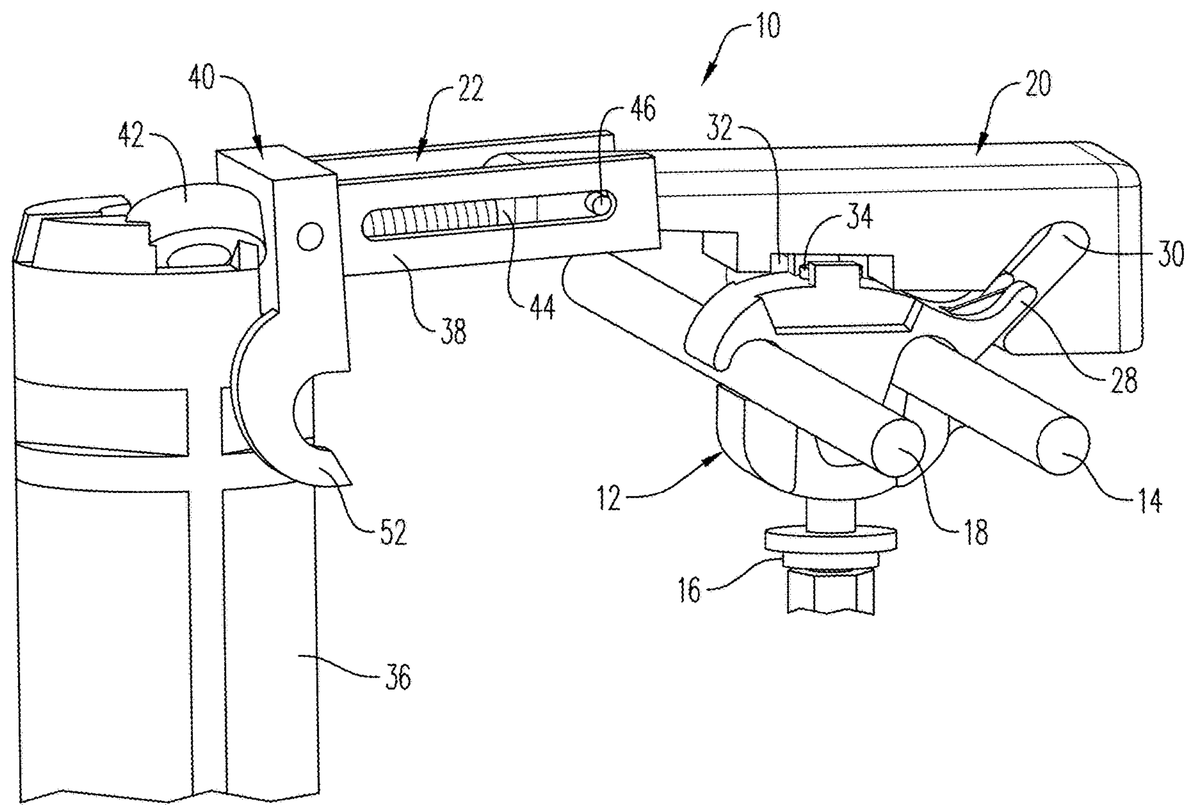
FIG. 4 is a perspective view of the hot stick installation accessory of FIG. 3 during removal from the installed electrical coupling component.
Figure 5:
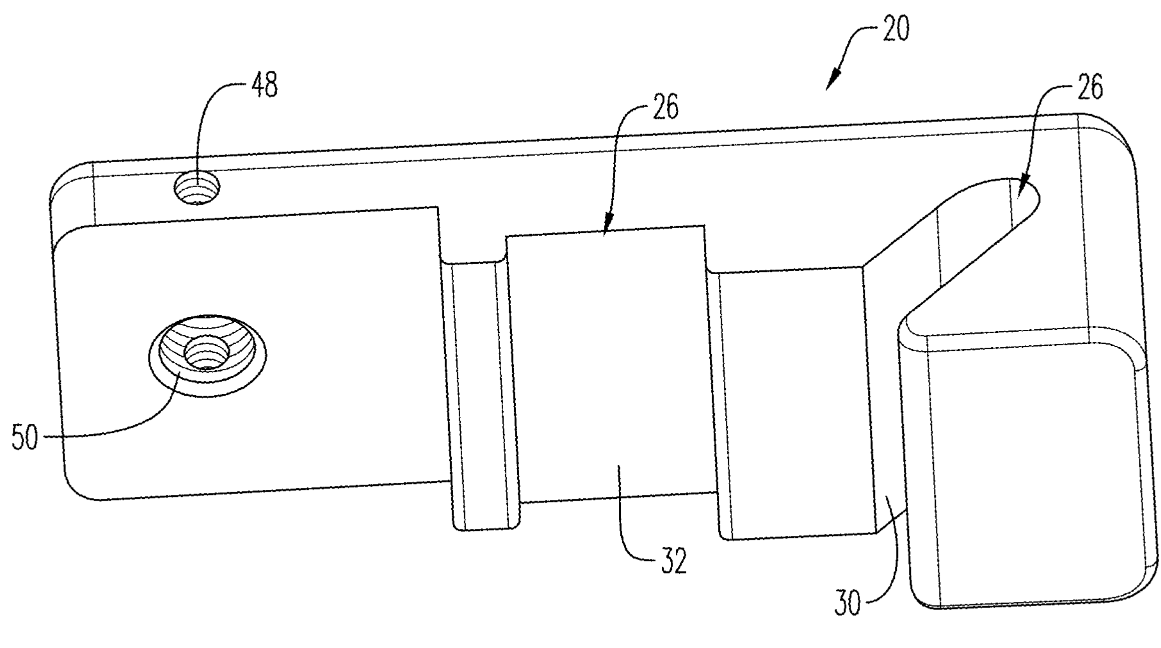
FIG. 5 is a perspective view of an exemplary embodiment of a cap portion of the hot stick installation accessory of FIG. 1.
Figure 6:
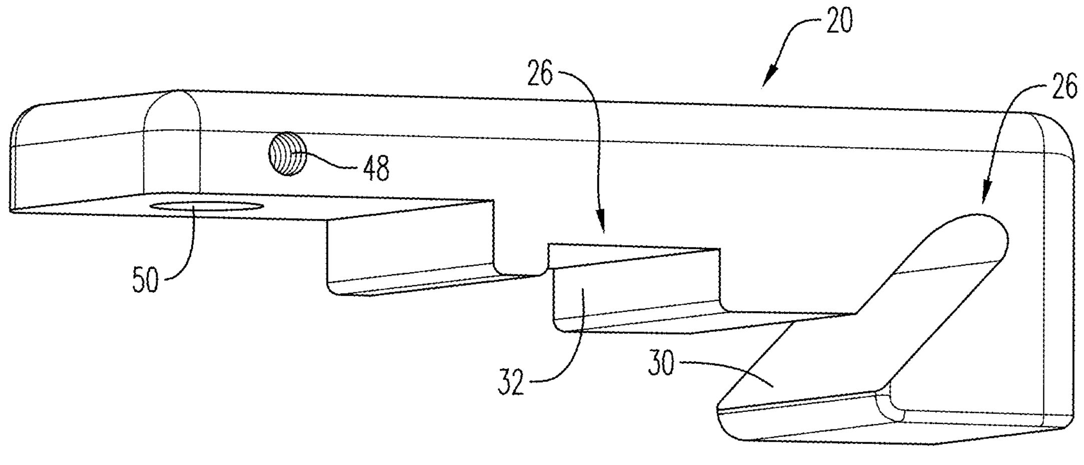
FIG. 6 is a side view of the cap portion of FIG. 5.
Figure 7:
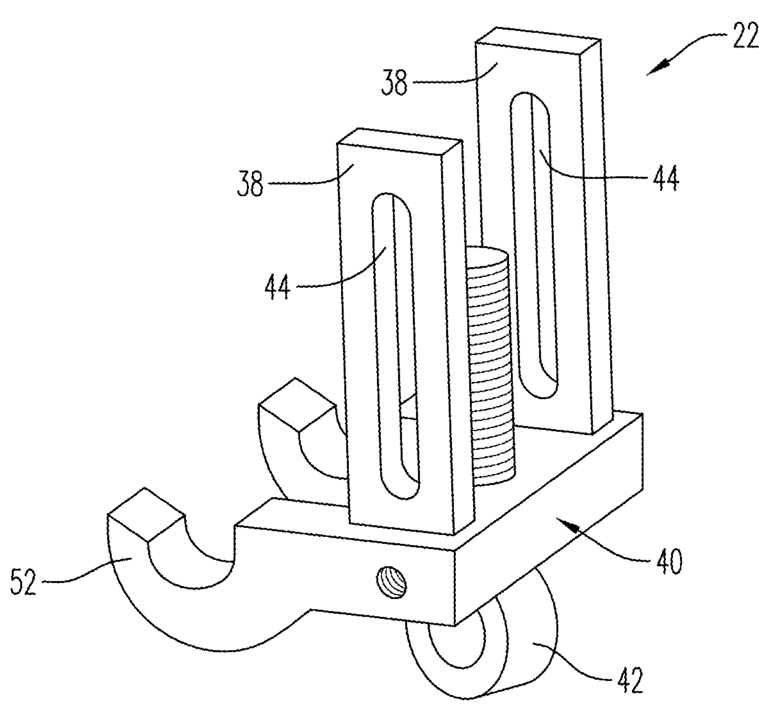
FIG. 7 is a perspective view of an exemplary embodiment of a moving section of the hot stick installation accessory of FIG. 1.
Figure 8:
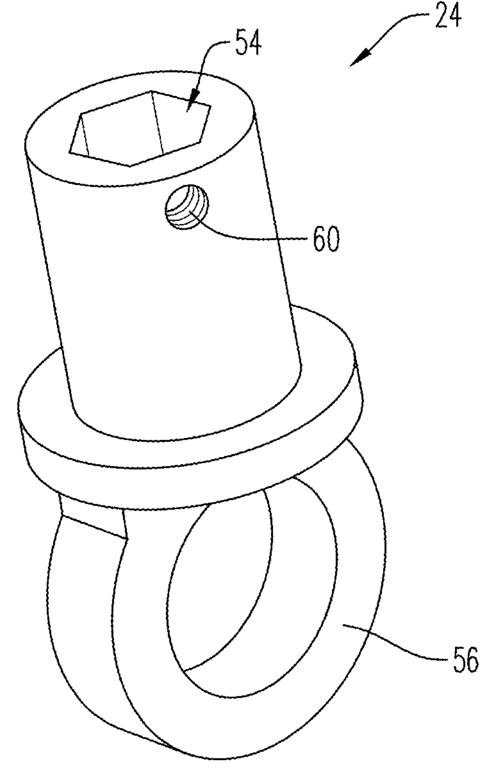
FIG. 8 is a perspective view of an exemplary embodiment of a tool portion of the hot stick installation accessory of FIG. 1.

In some embodiments, base 40 further includes a threaded opening 50 that can be selectively threadably engaged by threaded member 42 as shown in FIG. 3 or disengaged from the opening as shown in FIGS. 1-2 and 4. When member 42 and opening 50 are engaged, rotation of the threaded member 42 by a hot stick 36 slides base 40 along legs 38 between the open and closed positions.

In some embodiments, base 40 can include one or more arms 52 that depend from moving section 22 towards holding region 26 of cap portion 20. In this manner, base 40 is configured to engage conductor 18 when the base is slid along legs 38 towards cap portion 20 to the closed position as shown in FIG. 3. Thus, accessory 10 can prevent inadvertent disengagement from conductor 18 during installation of electrical coupling component 12 with line or main conductor 14.

Furthermore, accessory 10 is configured, by way of the sliding and pivoting motions, to allow the accessory to be removed from the top or upper side of electrical coupling component 12 after installation.

Tool 24 includes a torque application region 54 and a hook 56. Region 54 engages bolt connection 16 and hook 56 can be engaged by hot stick 36. In this manner, tool 24 can be used to tighten bolted connection 16, which secures electrical coupling component 12 in position on conductors 14, 18. It should be noted that torque application region 54 is shown by way of example as a socket for engaging a bolt head of bolted connection 16. Of course, it is contemplated by the present disclosure for torque application region 54 to be any torque applying device that corresponds to the shape of the torque receiving portion of bolted connection 16.

In some embodiments, tool 24 can include a securing device 60 that removably secures component 12 via bolted connection 16 to the tool. Device 60 is shown by way of example as a set screw that is tightenable onto bolted connection. Of course, it is contemplated by the present disclosure for device 60 to be any structure sufficient to removably secure tool 24 and bolted connection 16 to one another such as, but not limited to, a set screw, a ball and detent mechanism, a magnet, an adhesive, an interference or tolerance fit, and any combinations thereof.

In some embodiments, bolted connection 16 can include a shear region 58, shown in the illustrated embodiment as a shear nut. Shear region 58 is configured to fracture from bolted connection 16 when a desired torque is reached to prevent the user from over tightening the bolted connection on to component 12. Here, device 60 can be releasably secured to shear region 58. In this manner, tool 24 is configured to maintain control of shear region 58 in the tool after fracture.

An exemplary method of installation of component 12 onto conductors 14, 18 will now be described. Tool 24 is secured to a hook (not shown) of a first hot stick 36 in a known manner and component 12 is placed into the tool. When present, securing device 60 is used to releasably secure component 12 and tool 24 to one another. In this manner, first hot stick 36—having component 12 positioned therein—can be used to place component 12 on load or tap conductor 18.

Accessory 10 is secured to a hook (not shown) of a second hot stick 36 by engaging the hook with threaded member 42. Here, cap portion 20 is left in the open position with respect to sliding portion 22 as shown in FIG. 2. In this manner, accessory 10 can be installed over component 12 with upper jaw 28 of the component in area 30 and bolt head 34 of the component in area 32 using a second hot stick 36.

Second hot stick 36 is used to tighten threaded member 42 to slide cap portion 20 and sliding portion 22 to the closed position as shown in FIG. 3. When present, arms 52 engage conductor 18 to hold component 12 in place in the closed position.

Second hot stick 36 is then used to open component 12, by pulling downward on the hot stick while still engaged to threaded member 42. This causes cap portion 20 to pull up on area 30 holding upper jaw 28, which open component 12 and allows the user to move the component onto line or main conductor 14.

First hot stick 36 can then be used to tighten bolted connection 16 to close and secure component 12 onto conductors 14, 18. First hot stick 36 and tool 24 can then be removed from bolted connection 16—leaving accessory 10 firmly secured to component 12 and conductors 14, 18.

When securing device 60 is present, first hot stick 36 and tool 24 can be removed from bolted connection 16 by applying sufficient force to overcome the securing device. Further, when shear region 58 is present, bolted connection 16 is tightened until the shear region fractures so that hot stick 36, tool 24, and shear region 58 are removed together from component 12.

Next, second hot stick 36 engaged with threaded member 42 is used to open accessory 10 by loosening the threaded member to move cap portion 20 and sliding portion 22 with respect to one another to the open position as shown in FIG. 2 and so that, when present, arms 52 disengage conductor 18.

The second hot stick 36, remaining engaged with threaded member 42, is then used to pivots cap portion 20 and moving section 22 with respect to one another about pins 46 to the position shown in FIG. 4. In this position, accessory 10 can be removed from the top of component 12 by moving the accessory to remove upper jaw 28 of component 12 from area 30 of cap portion 20.

Accordingly, accessory 10 allows for placement of component 12 onto conductors 14, 18, holds the component securely in position when doing so, allows for the tightening of bolted connection 16, opens the component during installation on conductor 14, and allows for removal of the accessory from the top of the component all in a simple, easy to use manner.

It should also be noted that the terms “first”, “second”, “third”, “upper”, “lower”, and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

LIST OF REFERENCE NUMERALS hot stick installation accessory 10
electrical coupling component 12
line or main conductor 14
bolted connection 16
load or tap conductor 18
cap portion 20
moving section 22
tool portion 24 holding regions 26
upper jaw 28
area 30
another area 32
bolt head 34
hot stick 36
legs 38
base 40
threaded member 42
cam slot 44
pin 46
openings 48
threaded opening 50
arms 52
torque application region 54
hook 56
shear region 58
securing device 60

What is claimed is:

1. A hot stick installation accessory, comprising:

a cap portion having a region configured to removably hold an electrical coupling component; and moving section configured to slide with respect to the cap portion between an open and a closed position and configured to pivot on the cap portion between a first position and a second position, wherein the moving section includes a threaded member that is threadably engaged with the moving section, and wherein the threaded member is engageable by a hook of a hot stick so that rotation of the hot stick, and thus of the hook, results in rotation of the threaded member to move the moving section between the open and closed positions.

2. The hot stick installation accessory of claim 1, wherein the region of the cap portion comprises two regions.

3. The hot stick installation accessory of claim 1, wherein the region of the cap portion is configured so that the accessory is installable and removable from above the electrical coupling component.

4. The hot stick installation accessory of claim 1, wherein the moving section comprises a cam slot, the moving section being secured to the cap portion by a pin through the cam slot.

5. The hot stick installation accessory of claim 1, wherein the moving section has a base with a threaded opening positioned to threadably receive the threaded member.

6. The hot stick installation accessory of claim 1, wherein the moving section further comprises an arm depending from the moving section towards the region.

7. The hot stick installation accessory of claim 1, further comprising a tool portion engageable with a bolted connection of the electrical coupling component, the tool portion being engageable by the hook of the hot stick so that rotation of the hot stick, and thus of the hook, results in rotation of the tool portion and the bolted connection.

8. The hot stick installation accessory of claim 7, wherein the tool portion further comprises a securing device configured to releasably connect to the bolted connection.

9. The hot stick installation accessory of claim 8, wherein the securing device is selected from a group consisting of a set screw, a ball and detent mechanism, a magnet, an adhesive, an interference fit, a tolerance fit, and any combinations thereof.

10. A hot stick installation accessory, comprising:

a cap portion having a first region and a second region, the first region configured to receive an upper jaw of an electrical coupling component and a second region configured to hold a first bolted connection portion of the electrical coupling component; and a moving section configured to slide with respect to the cap portion between an open and a closed position and configured to pivot with respect to the cap portion between a first position and a second position, wherein the moving section, when in the open and first positions, is positioned with respect to the cap portion so that the first region can receive the upper jaw and the second region can receive the first bolted connection portion, wherein the moving section, when in the closed and second positions, is positioned with respect to the cap portion so that the moving section holds a conductor on which the electrical coupling component is positioned between the cap portion and moving section, and wherein the moving section comprises:

pair of legs each having a cam slot;

a pin through each of the cam slots so that the pair of legs are slidably and pivotally secured to the cap portion;

a base having a threaded opening, the base being secured to the pair of legs remote from the cap portion; and a threaded member threadably received in the threaded opening of the base and threadably received in the cap portion so that the threaded member runs along an axis that is parallel to cam slots.

11. The hot stick installation accessory of claim 10, wherein the moving section is engageable by a hot stick for sliding between the open and closed positions and pivoting between the first and second positions.

12. The hot stick installation accessory of claim 10, wherein the moving section is in the first position, when the cap portion is in the open position, and in the second position, when the cap portion is in the closed position.

13. The hot stick installation accessory of claim 10, wherein the base further comprises an arm depending from the base, the arm holds the lower jaw when the moving section is in the closed and second position.

14. The hot stick installation accessory of claim 10, further comprising a tool portion engageable with a second bolted connection portion of the electrical coupling component, the tool portion being engageable by a hot stick so that rotation of the hot stick results in rotation of the tool portion and the second bolted connection portion with respect to the first bolted connection portion.

15. The hot stick installation accessory of claim 14, wherein the tool portion further comprises a securing device configured to releasably connect to the second bolted connection portion, wherein the securing device is selected from a group consisting of a set screw, a ball and detent mechanism, a magnet, an adhesive, an interference fit, a tolerance fit, and any combinations thereof.

16. A hot stick installation accessory, comprising:

a cap having a first region and a second region; and a leg secured by a pin to the cap so that the leg is slidably and pivotally secured to the cap, the leg being slidable with respect to the cap between an open and a closed position, and the leg being pivotable on the cap between a first position and a second position, wherein the leg, when in the open and first positions, is positioned with respect to the cap so that the first region can receive an upper jaw of an electrical coupling component and the second region can receive a bolt of the electrical coupling component, and wherein the leg, when in the closed and second positions, is positioned with respect to the cap so that the leg can holds a conductor on which the electrical coupling component is positioned.

* * * * *